United States Patent [19]

Waehner

[11] 3,793,480

[45] Feb. 19, 1974

[54] EXPONENTIAL TRANSCONDUCTANCE MULTIPLIER AND INTEGRATED VIDEO PROCESSOR

[75] Inventor: Glenn C. Waehner, Riverside, Conn.

[73] Assignee: United Aircraft Corporation, East Hartford, Conn.

[22] Filed: Dec. 29, 1971

[21] Appl. No.: 213,509

[52] U.S. Cl. ..... 178/7.3 R, 178/7.5 R, 178/DIG. 16, 307/230, 328/144, 328/145

[51] Int. Cl. ........ H04n 5/20, H04n 5/58, G06g 7/12

[58] Field of Search .... 178/5.4 R, 7.1, 7.2, DIG. 16, 178/7.3 R, 7.5 R; 307/229, 230; 328/142, 143, 144, 145

[56] References Cited

UNITED STATES PATENTS

| | | | |
|---|---|---|---|
| 3,643,107 | 2/1972 | Gilbreath | 307/229 |
| 3,445,681 | 5/1969 | Cattermole et al. | 307/229 |
| 3,689,752 | 9/1972 | Gilbert | 307/229 |

*Primary Examiner*—Robert L. Griffin
*Assistant Examiner*—George G. Stellar
*Attorney, Agent, or Firm*—Melvin Pearson Williams

[57] ABSTRACT

A linear transconductance multiplier of the type having a pair of transistors connected in common emitter configuration to a source of tail current, and having each base of the transistors connected through respective diodes to another current source, is modified so as to provide an output (voltage or current) which is a function of a fractional exponent of the input (voltage or current) by placing a diode in series between each emitter and the tail current source. The diodes may be shunted by a switch so as to provide selectivity between linear and exponential functions, or the diodes may be partially shunted so as to adjust the exponential function between unity (linear) and the minimum exponent obtainable. Providing additional diodes in series with the transistor emitters decreases the exponent further. An integrated video processor comprises an exponential transconductance multiplier having differential inputs with contrast control provided by adjustment of the tail current, gamma correction being achieved automatically by the nonlinear function of the multiplier; the multiplier output is fed to a brightness-controlled, final amplifier.

8 Claims, 9 Drawing Figures

EXPONENTIAL TRANSCONDUCTANCE MULTIPLIER AND INTEGRATED VIDEO PROCESSOR

BACKGROUND OF THE INVENTION

1. Field of Invention

This invention relates to transistor circuitry and more particularly to an exponential transconductance multiplier and an integrated video processor employing the same.

2. Description of the Prior Art

As is known in the cathode ray tube art the brightness of the resulting pattern at the screen of the CRT varies roughly as a function of the square of the control grid voltage. This is frequently compensated for in CRT circuitry by what is commonly referred to as "gamma correction" which provides the required nonlinearity, roughly a square root function, to the video signal. This is frequently achieved with a diode network that approximates the square root with straight line segments.

In a number of CRT environments, such as industrial control monitors, airborne situation displays, and the like, the ambient lighting varies significantly, requiring that the brightness of the display be continuously adjusted. In cases where continuous readjustment of the display controls cannot be achieved manually (such as the pilot of an aircraft who must concentrate on navigation and weapon delivery), an automatic brightness compensation control is needed. To implement such a control, a wide bandwidth analog multiplier controlled by an ambient light sensor is required. Because of nonlinear characteristics and wide production variations, most video multiplier must be enclosed in the feedback loop that samples the output and corrects the gain as necessary. This approach adds considerable complexity to the indicator.

A typical video processor includes a differential input amplifier which drives some sort of a video gain control to provide the desired contrast; the gain control may comprise a multiplier having a contrast control input thereto, or may comprise a manually adjusted passive network which in turn, however, demands that video be presented over coaxial cable to the panel where the manual control is mounted. The gain control feeds a suitable DC level setting stage which may typically comprise a linear amplifier provided with bias controlled by a brightness control. The DC level setting stage feeds a gamma correction stage which typically comprises a diode/resistor network which approximates a square root function, the output of which is fed to a final amplifier for driving the control grid of a CRT, thus to achieve a level adjusted gain or contrast control linear generation of light as a function of the video input signal.

Because gamma correction and autobrightness functions are difficult to realize accurately and are therefore costly, they may often be omitted from a CRT display system.

SUMMARY OF INVENTION

The primary object of the present invention is to provide an improved exponential multiplier. Other objects include the provision of simplified gamma correction and autobrightness compensation for CRT display systems, and the provision of improved, simplified integrated video processor systems for CRT displays.

According to the present invention, diode inserted between the transistors and the tail current source in a transconductance multiplier provide a fractional exponential output versus input function to the multiplier.

In further accord with the present invention, linear brightness compensation is provided to a video amplifier by controlling the tail current in a transconductance multiplier through which the video signal is fed; use of an ambient light sensor provides automatic compensation.

In still further accord with the present invention, an exponential transconductance multiplier is provided with a differential input thereby to achieve common mode rejection in addition to gamma correction and automatic brightness compensation.

In accordance with one embodiment of the invention, an integrated video processor comprises a transconductance multiplier having diodes inserted between the transistors and the tail current to cause the output to be a fractional exponential function of the input, control over the tail current providing automatic brightness, the transistors being connected for differential input for common mode noise rejection, the output of the multiplier being connected to a final amplifier having a brightness control input thereto. In further accord with this aspect of the invention, the transistors and diodes of the multiplier, and of the current sources for operating the same may all be provided by transistors (some of which are connected in diode configuration) formed on the same substrate and thereby having mutually similar, matched characteristics.

The present invention obviates the need for multiplicity of complex circuits while providing accurate and temperature stable video processing of a simplified form.

Other objects, features and advantages of the present invention will become more apparent in the light of the following detailed description of preferred embodiments thereof, as illustrated in the accompanying drawing.

DESCRIPTION OF THE PREFERRED EMBODIMENT

Figure 1:
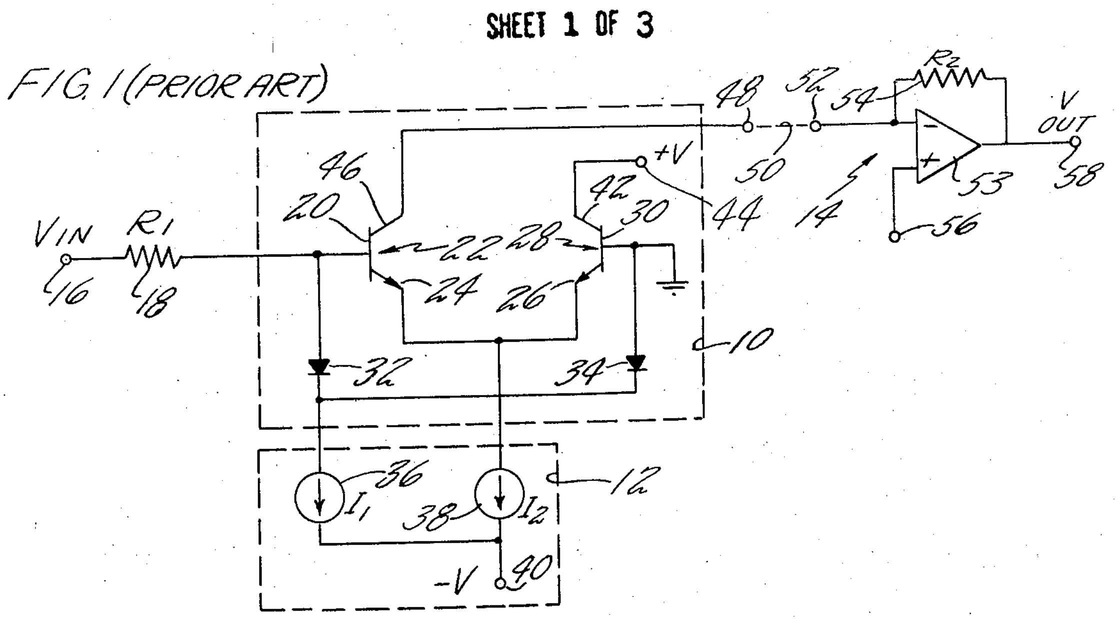
FIG. 1 (PRIOR ART)
FIG. 1 is a simplified schematic diagram of a linear transconductance multiplier known to the art.

Referring now to FIG. 1, a transconductance multiplier 10 of the type known to the art is shown connected with current sources 12 and an output amplifier 14. The input to the multiplier from a terminal 16 is through a resistor 18 that converts an input voltage to an input current to the base 20 of an NPN transistor 22. The emitter 24 of the transistor 22 is connected to the emitter 26 of another transistor 28. The base 30 of the transistor 28 is grounded, and both bases 20, 30 are connected through respective diodes 32, 34 to a first source 36 of current $I_1$. The common emitters 24, 26 are connected to a second source 38 of current $I_2$. Both of the current sources 36, 38 may conveniently be connected to a negative potential source 40. The collector 42 of the transistor 28 is connected to a suitable source 44 of positive voltage +V, and the collector 46 of the transistor 22 is connected to a multiplier output terminal 48 which may be provided with a connection 50 to the input terminal 52 of the amplifier 14. The amplifier 14 may comprise a differential operational amplifier 53 having negative feedback through a resistor 54 (designated $R_2$). A second input terminal 56 may be provided with a suitable voltage signal which could represent (in a video processor) a brightness level (or black level) control input. The voltage at an output terminal 58 of the amplifer 14 as a function of the voltage at the input terminal 16 is illustrated in FIG. 2 to be an approximately linear function of the voltage at the input terminal 16, as follows:

$$V_{out} \approx R_2 I_2 (V_{in}/R_1 I_1) \qquad (1)$$

This near-linearity is achieved by the provision of the diodes 32, 34 and the current source 36.

Figure 2:
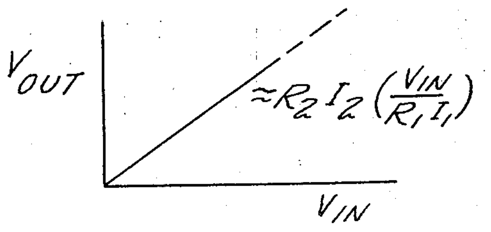
FIG. 2 (PRIOR ART)
FIG. 2 is an illustration of the output versus input characteristic of the multiplier shown in FIG. 1.

The linear transconductance multiplier illustrated in FIGS. 1 and 2 is well known in the art, and is available in integrated circuit form from a number of nationally known suppliers.

Figure 3:
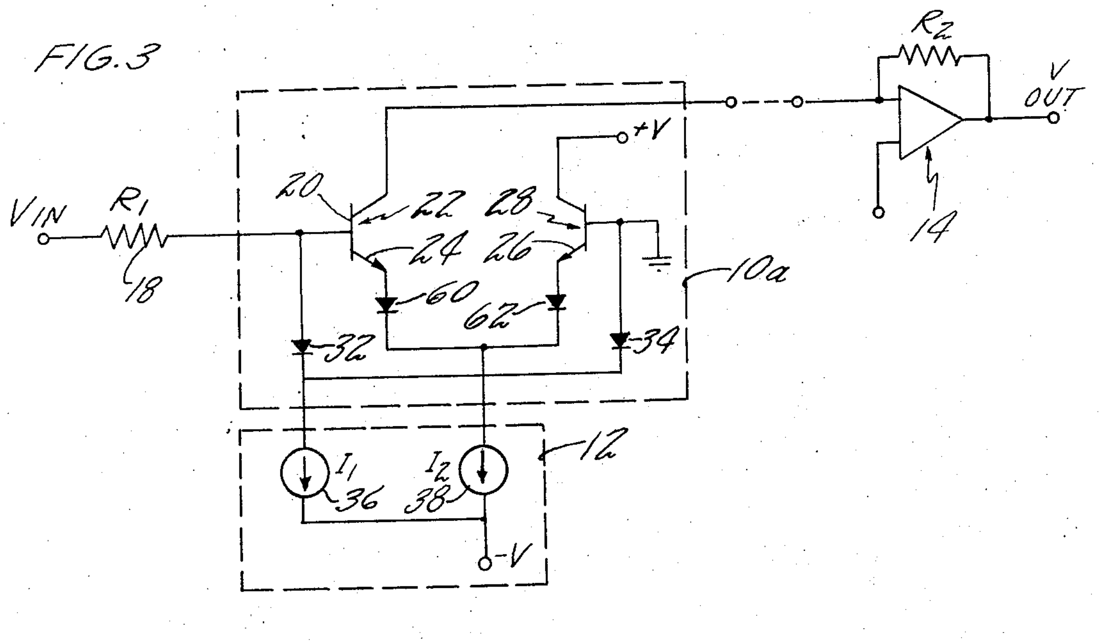
FIG. 3 is a simplified schematic diagram of an exponential transconductance multiplier in accordance with the present invention.
Figures 6, 9:
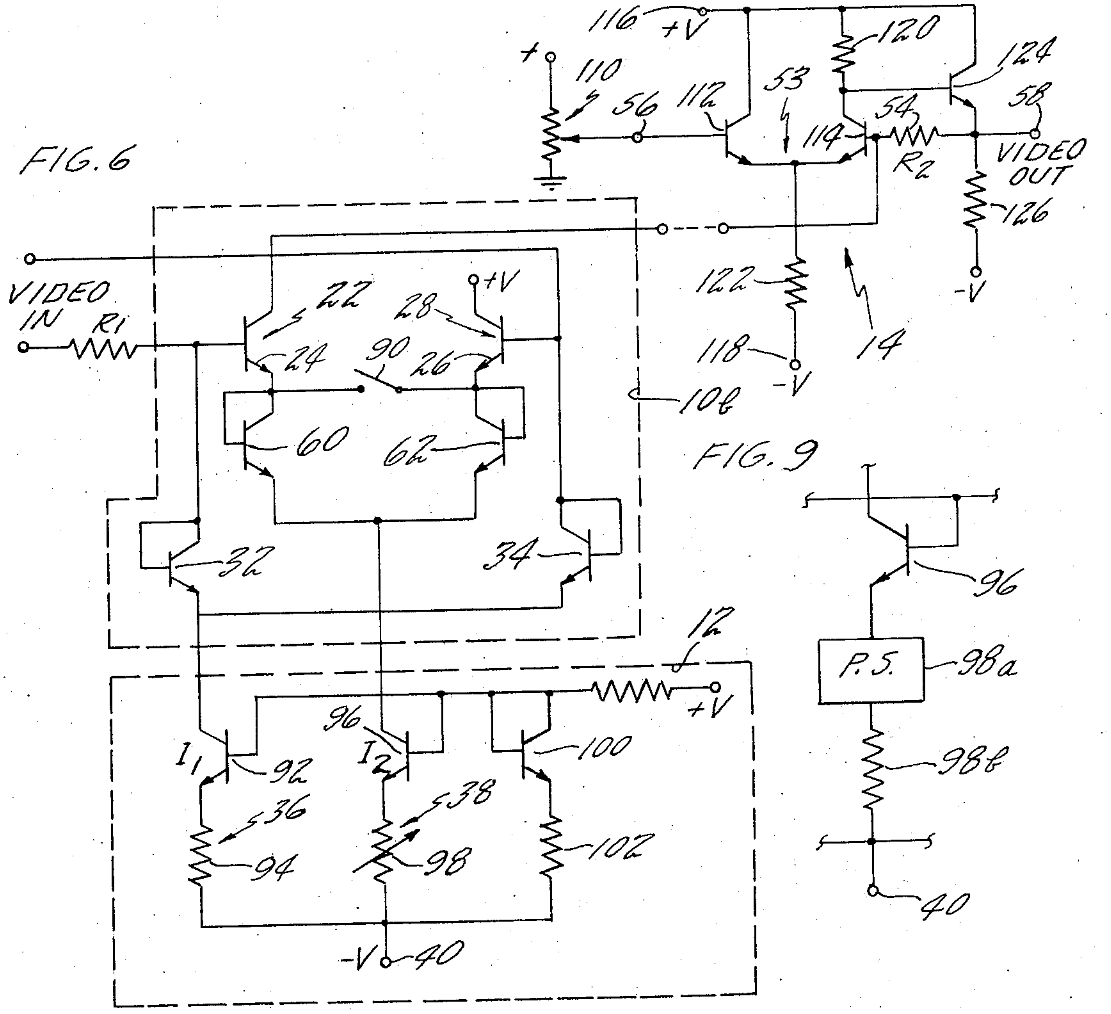
FIG. 6 is a schematic diagram of an integrated video processor in accordance with the present invention.
FIG. 9 is a partial schematic diagram of a modification of a current source as in FIG. 6.

In accordance with the present invention, the transconductance multiplier of FIG. 1 is modified so as to provide a nonlinear transconductance multiplier 10a, as shown in FIG. 3, by the inclusion of a pair of diodes 60, 62 between the emitters 24, 26 and the current source 38. The nature of the exponential function of the multiplier 10a is illustrated by summing the voltages around a loop commencing at the base 20, through the diodes 32, 34, through the base emitter junction of the transistor 28, through the diodes 62, 60 and through the base emitter junction of the transistor 22. In making this voltage summation, the diodes 32, 34, 60, 62 are assumed to be diode connected transistors (with the collector shorted to the base) as is illustrated in FIG. 6 and described hereinafter. As used herein, V will denote the base/emitter voltage of the respective transistors. The summation is as follows:

$$V_{32} - V_{34} = V_{22} + V_{60} - V_{28} - V_{62} \qquad (2)$$

As is known in the art, the expression representing the base/emitter voltage of a transistor is given as $$V = (KT/)\ \ln\ (I_c/I_s) \text{ (assuming infinite Beta yields)}, \qquad (3)$$

where K = Boltman's constant
T = the temperature in degrees Kelvin
q = the electron charge
$I_c$ = the collector or diode current
$I_s$ = the reverse saturation current, related to the area of the junction.

Now define $X = V_{in}/I_1R_1$ ($I_{in} = V_{in}/R_1$, so $X = I_{in}/I_1$ (4)

and $Y = I_{c_{22}}/I_2$, such that $I_{c_{22}} = I_2 Y$ (5)

$$\text{Then: } I_{c_{32}} = I_1 X \qquad (6)$$

$$I_{c_{34}} = I_1(1-X) \qquad (7)$$

$$I_{c_{60}} = I_{c_{22}} = I_2 Y \qquad (8)$$

$$I_{c_{28}} = I_2 - I_{c_{22}} = I_2(1-Y) \qquad (9)$$

$$I_{c_{62}} = I_{c_{28}} = I_2(1-Y) \qquad (10)$$

Combining equations (2) through (10)

$$(KT/q)\ \ln\ (I_1X/I_s) - (KT/q)\ \ln\ [I_1(1-X)/I_s] = (KT/q)\ \ln\ (I_2Y/I_s) + (KT/q)\ \ln\ (I_2Y/I_s) \qquad (11)$$
$$- KT/q\ \ln\ [I_2(1-Y)/I_s] - (KT/q)\ \ln\ [I_2(1-Y)/I_s]$$

(12)

$$\frac{KT}{q}\left(\ln \frac{I_1X}{I_s} - \ln \frac{I_1(1-X)}{I_s}\right) = 2\frac{KT}{q}\left(\ln \frac{I_2Y}{I_s} - \ln \frac{I_2(1-Y)}{I_s}\right)$$

Now, assuming that all of the components 22, 28, 32, 34, 60, 62 are nearly identical transistors formed on the same chip, $I_s$ will be the same for each of them. This is a fair assumption since a chip with six transistors on it are available (and it costs less than six discrete transistors); but even if discrete transistors were used and $I_s$ varied, the result would be substantially the same, yielding perhaps a 10 percent error rather than the roughly 1 percent variation which results, in accordance with the invention, utilizing identical transistors. Simplifying equation (12), $$\ln\ [I_1X/I_1(1-X)] = 2\ \ln\ [I_2Y/I_2(1-Y)] \qquad (13)$$

Since 2 ln A = ln $A^2$, and cancelling $I_1$ and $I_2$, (14)

$$\sqrt{X/1-X} = Y/1-Y = \sqrt{X}/\ \sqrt{1-X} \qquad (15)$$

$$\sqrt{X} - Y\ \sqrt{X} = Y\ \sqrt{1-X} \qquad (16)$$

(17)

$$Y = \frac{\sqrt{X}}{\sqrt{1-X}+\sqrt{X}} = \frac{1}{\frac{\sqrt{1-X}}{\sqrt{X}}+1} = \frac{1}{\sqrt{\frac{1-X}{X}}+1} = \frac{1}{\sqrt{\frac{1}{X}-1}+1}$$

By plotting Y for values of X between zero and one half, and examining the result, it is seen that $$Y \approx X^{1/2.2} \qquad (18)$$

to a high degree of accuracy, approximately 1 percent. X is limited to values between zero and 0.5 because the amplification function of the multiplier 10*a* changes from being fractionally exponential to being exponential for higher values of X. It should be noted that limiting X to a value of 0.5 is the equivalent of saying the input current should never be more than half of $I_1$ in order for this fractional exponential relationship to hold to a close approximation.

The voltage output will be the collector current of the transistor 22 multiplied by a series output resistor (which may be the feedback resistance $R_2$ of amplifier 14, or any other series resistance). By the definition of equation 5, $$I_{C22} = I_2 Y \quad (19)$$

so that the voltage output is $$V_{out} = (I_2 Y) R_2 \approx I_2 R_2 (X)^{1/2.2} \approx I_2 R_2 (V_{in}/I_1 R_1)^{1/2.2} \quad (20)$$

and the current relationship is $$I_{out} = I_2 Y = I_2 (I_{in}/I_1)^{1/2.2} \quad (21)$$

As is known in the art, the light intensity which appears on the screen of the CRT relates to roughly the square of the control grid voltage. This function is called gamma, and it varies from tube to tube so that an average value of gamma can be taken as the 2.2 power. Thus gamma correction which approximates the reciprocal 2.2 power will provide substantial optical linearity for the average cathode ray tube. This is one important feature of the present invention: the provision of substantially accurate gamma correction by means of the exponential multiplier 10*a*.

An important feature of the invention is that the gamma correction function (reciprocal 2.2 power) is independent of temperature since, as seen in equation (13), the factor T drops out of the voltage summation. In other words, all of the transistors being affected the same, temperature has no net effect on the exponential function of the multiplier 10*a*.

Figure 4:
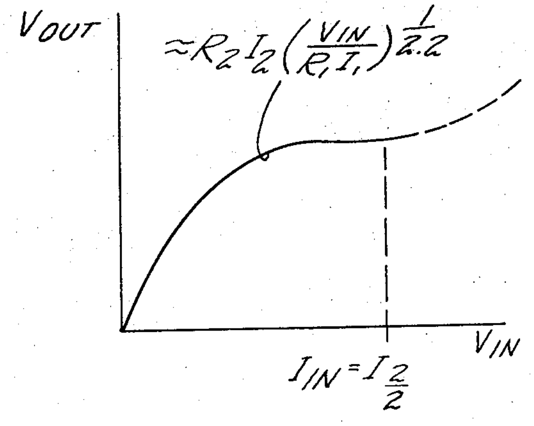
FIG. 4 is an illustration of the output versus input function of the multiplier shown in FIG. 3.

It should be noted that both the linear transconductance multiplier known to the prior art and described with respect to FIGS. 1 and 2 hereinbefore, and the exponential transconductance multiplier in accordance with the present invention and described with respect to FIGS. 3 and 4 require an input current source, and provide an output current which is either the linear or exponential function, respectively, of the input current. The resistor $R_1$ is utilized to convert an input voltage to an input current, so that the input appears as a current source to the transconductance multiplier; similarly, the resistor $R_2$ in the feedback path of the amplifier 14 allows an output voltage to be developed thereacross, whereby to achieve a voltage/voltage transfer function rather than a current/current function. Thus, the relationship between the input and the output can be considered the same whether it be considered to be voltage or current.

Figure 5:
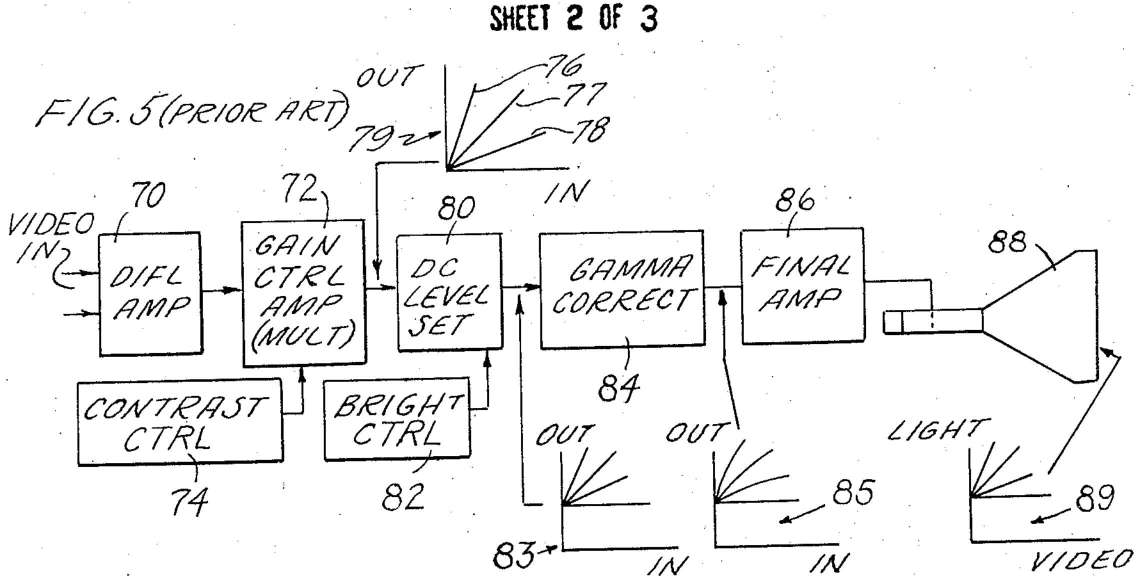
FIG. 5 (PRIOR ART)
FIG. 5 is a simplified block diagram of a typical video processor system known to the prior art.

As alluded to hereinbefore, one important application of the exponential multiplier in accordance with the present invention is in a video processing system. An exemplary video processing system typical of those known to the prior art is illustrated in FIG. 5. Therein, the video signal is applied to a differential amplifier 70, the output of which is applied to a suitable gain control circuit 72. This circuit could comprise a simple potentiometer mounted on a control panel provided that the video signal were coupled to and from the potentiometer with coaxial cable (which is undesirable) so as to provide direct attenuation of the video signal under operator control. On the other hand, the gain control 72 could comprise a linear transconductance multiplier of the type described with respect to FIGS. 1 and 2 hereinbefore, or other suitable multiplier, having the multiplicand function fed thereto in response to a contrast control 74 so as to provide any desired gain characteristic 76, 77, 78 as shown in illustration 79. The gain adjusted video is then fed to a DC level setting device 80 which is variously called a black level reference or brightness circuit. This may comprise any amplifier capable of establishing a DC bias in response to a suitable brightness control 82 so as to provide the video signals at a desired reference level as shown in illustration 83. Then the gain and level adjusted video (having suitable contrast and brighness) is applied to a gamma correction circuit 84 to apply roughly a square root function to the video (as in illustration 85) so as to compensate for the square law relationship between brightness of the image on the CRT as a function of control grid voltage. Circuit 84 may typically comprise, in the prior art, a diode/resistor network which approximates the square root (or roughly the square root) as a series of short, straight line segments. The output of the gamma correction circuit 84 is applied to a final amplifier 86 for driving the control grid of a CRT 88, linearly, as seen in illustration 89. Thus it can be seen that a significant amount of hardware is required for a high quality video processing system.

In contrast, the present invention provides an integrated video processing system which is far simpler than those heretofore known to the art. Referring now to FIG. 6, a transconductance multiplier 10*b* is seen to be identical to the transconductance multiplier 10*a* illustrated in FIG. 3 with two exceptions. The transistors 22, 28 are differentially connected to the video input so as to provide the common noise rejection normally provided by an input differential amplifier (such as the amplifier 70 in FIG. 5). Also, switch 90 is connected across the emitters 24, 26 so as to shunt the diodes 60, 62. When shunted, the diodes 60, 62 are in parallel with each other, and present a very low impedance in series with the higher impedance of the tail current source, so are effectively out of the circuit. This allows selectivity as between linearity and the reciprocal nonlinearity described with respect to FIG. 3 hereinbefore. Such a circuit may be used to advantage in a video processing system wherein the video may itself be applied to the system with gamma correction already provided thereto in some cases, but the video may be applied thereto without gamma correction in other cases. Thus, the single video processor (as seen in FIG. 6) could serve an apparatus requiring both linear and gamma correction functions.

Also illustrated in FIG. 6 is a typical configuration of suitable current sources 12 which may be utilized in practicing the present invention. The current source 36 which provides the current $I_1$ may comprise an NPN transistor 92 connected through a suitable resistor 94 to the source 40 of negative potential (−V). The current generator 38 which provides the current $I_2$ may comprise a transistor 96 connected through a suitable variable impedance 98 to the source 40. The variable impedance 98 may conveniently comprise a manually operable gain or contrast potentiometer, or it may comprise, as shown in FIG. 9, a photo sensor 98*a* connected in series with a resistance 98*b* so as to provide automatic brightness compensation. Since the output voltage is directly proportional to the tail current ($I_2$), as is known in the art and as is demonstrated in equation 20 with respect to the nonlinear transconductance multiplier herein, the gain of the multiplier **10*b* is simply adjusted, in a linear fashion, by simple adjustment of the current $I_2$. Assuming large beta (which is a fair assumption) then the current $I_2$ will be substantially linearly controlled by the impedance 98 (or by the sensor 98*a*). A diode 100 (which is shown as a base/collector connected transistor) and a resistor 102 provide temperature stability to the current sources 36, 38, in a manner which is well known in the art. Thus, as the emitter resistors 94, 98 tend to vary so does the resistor 102, which provides an inverse signal to the respective bases of the transistors 92, 96** thereby tending to maintain the current therethrough constant.

Also illustrated in FIG. 6 is a specific configuration for an output amplifier 14 which is suitable for use with the present invention. The input terminal 56 is shown connected to a potentiometer 110 which when connected across a suitable voltage will serve as a brightness control 82 (FIG. 5) thereby providing the DC level setting function (of the block 80) within the amplifier 14. The differential amplifier 53 comprises a pair of common emitter transistors 112, 114 connected between suitable plus and minus potential sources 116, 118 through resistors 120, 122. The output of the differential amplifier 53 is taken from the collector of the transistor 114 and applied to the base of a transistor 124 which comprises an emitter follower serving as a buffer amplifier to develop the video output at terminal 58 across a resistor 126. The output is fed back through the resistor 54 ($R_2$) to the base of transistor 114 to supply a negative feedback to the differential amplifier 53.

Thus it can be seen that all of the functions of a video processing system are provided in accordance with one aspect of the present invention by the apparatus of FIG. 6.

Figure 7:
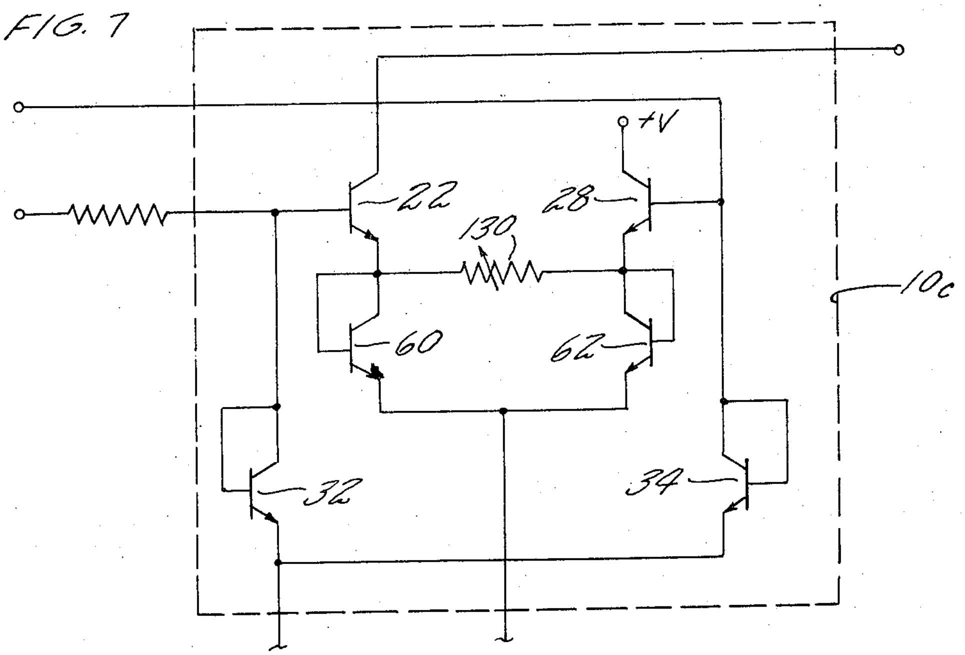
FIG. 7 is a partial schematic diagram of a modification of the exponential multiplier in accordance with the invention as illustrated in FIG. 6.

Referring now to FIG. 7, an additional embodiment of an exponential transconductance multiplier **10*c* in accordance with the present invention is seen to be the same as the multiplier 10*a* dscribed with respect to FIGS. 3 and 4 hereinbefore with the exception of the fact that a variable resistor 130 is provided so as to permit selective shunting of the diodes 60, 62, either completely (when resistor 130 is set for zero resistance) or partially so as to mitigate the nonlinear effect. In other words, when the resistor 130 is set to some finite resistance, the fractional exponent of equations 18 and 20 becomes larger, and reaches unity when the resistance is zero. By setting the resistor 130** to a suitably high resistance, the exponent can be changed from reciprocal 2.2 to a close number such as reciprocal 2.1, thereby to achieve more nearly perfect gamma correction for a given CRT, if desired.

Of course, provision of any resistance across the diodes 60, 62 alters the lack of temperature dependence of the multiplier circuit 10b; however, if the resistance is very large and thus tends to modify the reciprocal exponent only by a few percent, the temperature dependence would be effected only by a few hundredths of a percent.

Figure 8:
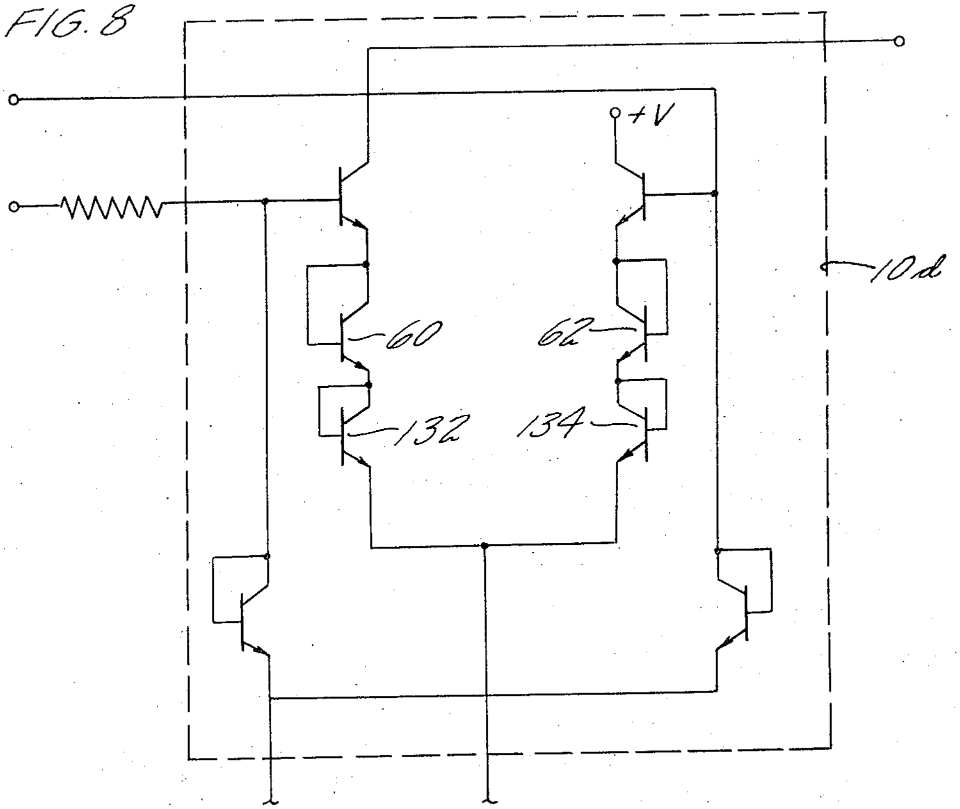
FIG. 8 is a partial schematic diagram illustrating another modification of an exponential multiplier in accordance with the invention of the type illustrated in FIG. 6.

Referring now to FIG. 8, an exponential transconductance multiplier 10d is seen to be the same as the multiplier **10*a*, described with respect to FIGS. 3 and 4, with the exception of the fact that an additional pair of diodes 132, 134 have been inserted in series with the diodes 60, 62 respectively. This has the effect of decreasing the exponent (increasing the denominator of the fractional exponent) such that one could approach the cube root function with the multiplier 10*d*. This can be seen with reference to equations 11 and 12 wherein adding an additonal emitter base voltage to each side of the loop would have the effect of changing the factor "2" in the right side of equation 12 to the number "3." However, in practice there is a limit on the effect which additional diodes will have, due to the initial assumption that the transistors have infinite Beta yields; since this is not true, it cannot be assumed that the mathematics of equations (2)–(12) will hold to a close approximation with the additional base-emitter junctions in the loop. However, the additional diodes will provide a smaller exponent, and where a root of a higher power is desired, this technique may prove advantageous. As is true with respect to the multiplier 10*a* of FIG. 3, whatever exponent is acquired by the technique of providing additional diodes, that exponent will be free of variation as a function of temperature. The additional diodes of FIG. 8 may be combined with the resistor 130 of FIG. 7 so as to decrease the exponent slightly (say, to reciprocal 2.4**) so as to match the gamma correction to a given CRT more accurately (or otherwise to provide a desired exponential function, within limits).

Although the invention has been shown and described with respect to preferred embodiments thereof, it should be obvious to those skilled in the art that various changes and omissions in the form and detail thereof may be made therein without departing from the spirit and the scope of the invention.

Having thus described typical embodiments of my invention, that which I claim as new and desire to secure by Letters Patent of the United States is:

1. In a transconductance multiplier of the type having the emitters of a pair of similar transistors connected to a common tail current source, and the bases of said pair of transistors connected through respective first diodes to a second common current source, said transistors having high beta yields and a base to emitter voltage which is a logrithmic function of the collector current therein, an output current comprising the collector current of one of the transistors being a function of the input current to the base of one of said transistors, the improvement comprising:

a pair of second diodes, each connected between the emitter of each of said transistors and said common tail current source, whereby the output current is substantially a reciprocal exponential function of the input current; and a switch connected between said emitters for selectively short circuiting said second diodes.

2. A transconductance multiplier according to claim 1 wherein said tail current source is controlled by a manually operable contrast potentiometer, whereby the current in said source varies as a function of the setting of said potentiometer.

3. A transconductance multiplier according to claim 1 additionally comprising a variable impedance connected between said collectors for selectively shunting said diodes thereby to alter the relationship between the output current and the input current.

4. A transconductance multiplier according to claim 1 wherein said tail current source is controlled by a photosensor, whereby the current in said source increases as a function of ambient light in the vicinity of said photosensor.

5. A transconductance multiplier according to claim 4 including differential signal inputs, each connected to the base of one of said transistors, thereby to provide common mode noise rejection to signal inputs to said multiplier.

6. An integrated video processor for processing an input video signal for application to a CRT display, comprising:

a transconductance multiplier having an output current which varies as the product of a tail current applied to said multiplier and roughly the square root of an input current to said multiplier, said multiplier having differential inputs;

a tail current source supplying tail current to said multiplier, said tail current source being adjustable to vary the gain of said multiplier thereby to provide contrast control to said video processor;

a brightness control providing an adjustable signal level corresponding to a desired display brightness; and a differential amplifier connected for response at one input to said brightness control and at another input to said multiplier, said differential amplifier providing a video output signal corresponding to the output of said multiplier level-adjusted about a reference potential in dependence upon the setting of said brightness control.

7. The integrated video processor according to claim 6 wherein said transconductance multiplier has an output current which varies as the product of the tail current applied to said multiplier and substantially the reciprocal 2.2 power of input current thereto.

8. The integrated video processor according to claim 6 wherein said tail current source comprises a photo sensor disposed to sense the ambient light level in the vicinity of the CRT display, thereby to automatically correct contrast as a function thereof.

* * * * *